(12) United States Patent
Furutani et al.

(10) Patent No.: US 11,695,175 B2
(45) Date of Patent: Jul. 4, 2023

(54) SHEET-TYPE AIR CELL, METHOD FOR MANUFACTURING THE SAME, AND PATCH

(71) Applicant: Maxell, Ltd., Kyoto (JP)

(72) Inventors: Takahiro Furutani, Kyoto (JP); Hiroaki Ono, Kyoto (JP)

(73) Assignee: Maxell, Ltd., Kyoto (JP)

( * ) Notice: Subject to any disclaimer, the term of this patent is extended or adjusted under 35 U.S.C. 154(b) by 289 days.

(21) Appl. No.: 16/347,624

(22) PCT Filed: Mar. 12, 2018

(86) PCT No.: PCT/JP2018/009469
§ 371 (c)(1),
(2) Date: May 6, 2019

(87) PCT Pub. No.: WO2019/064637
PCT Pub. Date: Apr. 4, 2019

(65) Prior Publication Data
US 2019/0348730 A1    Nov. 14, 2019

(30) Foreign Application Priority Data

Sep. 28, 2017  (JP) ................................. 2017-187654
Sep. 28, 2017  (JP) ................................. 2017-187655

(51) Int. Cl.
*H01M 12/06*    (2006.01)
*H01M 12/02*    (2006.01)
(Continued)

(52) U.S. Cl.
CPC ........... *H01M 12/06* (2013.01); *H01M 12/02* (2013.01); *H01M 50/548* (2021.01);
(Continued)

(58) Field of Classification Search
CPC ............. H01M 12/06; H01M 2220/30; H01M 2300/0011; H01M 2300/0085; H01M 2/0212; H01M 12/02–065; Y02E 60/10
See application file for complete search history.

(56) References Cited

U.S. PATENT DOCUMENTS 4,585,710 A    4/1986  McEvoy
4,908,281 A    3/1990  O'Callaghan
(Continued)

FOREIGN PATENT DOCUMENTS

EP    3 518 339 A1    7/2019
JP    S60-136182    *    7/1985    ............ H01M 12/06
(Continued)

OTHER PUBLICATIONS

English Translation of KR20160009872.*
(Continued)

*Primary Examiner* — Kiran Quraishi Akhtar
(74) *Attorney, Agent, or Firm* — Birch, Stewart, Kolasch & Birch, LLP

(57) ABSTRACT

One aspect of the sheet-like air cell of the present invention includes a positive electrode having a catalyst layer, a negative electrode, a separator, and an electrolyte solution that are housed in a sheet-like outer case. The electrolyte solution is an aqueous solution that contains an electrolyte salt and has a pH of 3 or more and less than 12. The electrolyte solution contains a water-soluble high-boiling solvent with a boiling point of 150° C. or more in an amount of 3 to 30% by mass of the total solvent. Another aspect of the sheet-like air cell of the present invention includes a positive electrode having a catalyst layer, a negative electrode, a separator, and an electrolyte that are housed in a sheet-like outer case. The electrolyte is obtained by blending an electrolyte solution and a thickening agent. The electro-
(Continued)

lyte solution is an aqueous solution that contains an electrolyte salt and has a pH of 3 or more and less than 12.

16 Claims, 1 Drawing Sheet

(51) Int. Cl.
    *H01M 50/548* (2021.01)
    *H01M 50/55* (2021.01)
(52) U.S. Cl.
    CPC ........ *H01M 50/55* (2021.01); *H01M 2220/30* (2013.01); *H01M 2300/0011* (2013.01); *H01M 2300/0085* (2013.01)

(56) References Cited

U.S. PATENT DOCUMENTS

| | | | |
|---|---|---|---|
| 5,476,730 | A | 12/1995 | Okamura et al. |
| 2002/0142203 | A1* | 10/2002 | Ma .................... H01M 4/12 429/406 |
| 2007/0077485 | A1* | 4/2007 | Takamura ............. H01M 12/06 429/82 |
| 2007/0224500 | A1 | 9/2007 | White et al. |
| 2010/0191078 | A1 | 7/2010 | Yodfat et al. |
| 2012/0270116 | A1 | 10/2012 | Cho et al. |
| 2012/0321968 | A1 | 12/2012 | Sato et al. |
| 2014/0087274 | A1* | 3/2014 | Tzidon ................. H01M 12/08 429/406 |

FOREIGN PATENT DOCUMENTS

| | | | | |
|---|---|---|---|---|
| JP | 61-013580 | A | 1/1986 | |
| JP | S6113580 | * | 1/1986 | ............ H01M 12/06 |
| JP | 63019766 | A | 1/1988 | |
| JP | 1-163977 | A | 6/1989 | |
| JP | 02051876 | A | 2/1990 | |
| JP | 7-032030 | B2 | 4/1995 | |
| JP | 2568590 | * | 1/1997 | .............. H01M 4/06 |
| JP | 2001-307746 | A | 11/2001 | |
| JP | 2002-343450 | A | 11/2002 | |
| JP | 2004/288571 | * | 10/2004 | ........... H01M 12/06 |
| JP | 2004-288571 | A | 10/2004 | |
| JP | 2004288571 | * | 10/2004 | ........... H01M 12/06 |
| JP | 2009-530786 | A | 8/2009 | |
| JP | 2010-534084 | A | 11/2010 | |
| JP | 2011-146339 | A | 7/2011 | |
| JP | 2012-227119 | A | 11/2012 | |
| JP | 2014/165099 | * | 9/2014 | ........... H01M 12/08 |
| JP | 2014-183021 | A | 9/2014 | |
| JP | 2014165099 | * | 9/2014 | ........... Y02E 60/10 |
| JP | 2017-21924 | A | 1/2017 | |
| KR | 20160009872 | * | 1/2016 | ........... H01M 12/06 |
| WO | WO 2009/013734 | A2 | 1/2009 | |

OTHER PUBLICATIONS

English Translation of JP2568590.*
English Translation of JP2014165099.*
English Translation of JP2004288571.*
English Translation of JP S6113580.*
English Translation of JP60-136182.*
International Search Report (PCT/ISA/210) issued in PCT/JP2018/009469, dated May 22, 2018.
Extended European Search Report dated Nov. 6, 2019, for corresponding European Patent Application No. 18862072.8.
European Patent Office Communication pursuant to Article 94(3) EPC issued in the corresponding European Patent Application No. 18862072.8 dated Sep. 21, 2021.

* cited by examiner

SHEET-TYPE AIR CELL, METHOD FOR MANUFACTURING THE SAME, AND PATCH

TECHNICAL FIELD

The present invention relates to a sheet-type air cell with excellent storage properties, a method for manufacturing the sheet-type air cell, and a patch including the sheet-type air cell.

BACKGROUND ART

An air cell has a positive electrode and a negative electrode. The positive electrode is formed of an air electrode that includes manganese dioxide, carbon, or the like as a catalyst. The negative electrode includes metal particles such as zinc-based particles (zinc particles, zinc alloy particles, etc.) as an active material. Such an air cell has been used for many years as a power supply for, e.g., a hearing aid.

This type of cell is generally in the form of a button cell with an outer case made of a metal can. In a commercially available button cell, one to several air holes are formed at the bottom, where the positive electrode is located, to take air (oxygen) into the cell. The air holes have a diameter of about 0.2 to 0.5 mm.

Moreover, a sheet-type cell with an outer case made of a resin film has also been proposed. The resin film may be, e.g., a laminated film composed of aluminum and a thermoplastic resin. With this configuration, the cell can have a high degree of freedom in shape and excellent discharge characteristics (see Patent Document 1).

The above air cell allows gas to flow through it via the air holes. Therefore, e.g., when the humidity of the surrounding environment becomes low, water evaporates from the electrolyte solution in the cell and is dissipated to the outside of the cell system through the air holes. On the other hand, when the humidity of the surrounding environment becomes high, water vapor is incorporated into the cell so that the water content of the electrolyte solution is increased. Thus, it is known that the composition of the electrolyte solution is changed by a change in the humidity of the surrounding environment.

For this reason, if the cell is left to stand for a long period of time, the composition of the electrolyte solution can be changed to cause problems such as poor cell characteristics and leakage of the electrolyte solution.

Some solutions to these problems have been proposed (see Patent Documents 2 to 5). For example, polyhydric alcohol and/or its derivative may be added to the electrolyte solution to reduce the vapor pressure of the electrolyte solution. Alternatively, the negative electrode may be gelatinized by using a cross-linked material as a gelling agent for the negative electrode. Examples of the cross-linked material include a resin obtained by cross-linking a polymethacrylic acid-ethylene glycol copolymer with a crosslinking agent, cross-linked carboxymethyl cellulose, and cross-linked polyacrylic acid.

PRIOR ART DOCUMENTS

Patent Documents

Patent Document 1: JP 2004-288571 A
Patent Document 2: JP S61(1986)-13580A
Patent Document 3: JP 2002-343450 A
Patent Document 4: JP H7(1995)-32030 B
Patent Document 5: JP 2009-530786 A

DISCLOSURE OF INVENTION

Problem to be Solved by the Invention

However, using only the above technologies is not sufficient to significantly improve the storage properties of the air cell.

With the foregoing in mind, it is an object of the present invention to provide a sheet-type air cell with excellent storage properties, a method for manufacturing the sheet-type air cell, and a patch including the sheet-type air cell.

Means for Solving Problem

A first aspect of a sheet-type air cell of the present invention that has achieved the above object includes the following: a positive electrode having a catalyst layer, a negative electrode, a separator, and an electrolyte solution that are contained in a sheet-type outer case. The electrolyte solution is an aqueous solution that contains an electrolyte salt and has a pH of 3 or more and less than 12. The electrolyte solution contains a water-soluble high-boiling solvent with a boiling point of 150° C. or more in an amount of 3 to 30% by mass of the total solvent.

A second aspect of a sheet-type air cell of the present invention includes the following: a positive electrode having a catalyst layer, a negative electrode, a separator, and an electrolyte that are contained in a sheet-type outer case. The electrolyte is obtained by blending an electrolyte solution and a thickening agent. The electrolyte solution is an aqueous solution that contains an electrolyte salt and has a pH of 3 or more and less than 12.

In the sheet-type air cell of the second aspect, it is preferable that the thickening agent has a functional group in the molecule, the functional group including a carboxyl group or its salt, and that the electrolyte further contains a gelation accelerator composed of a polyvalent metal salt. A method for manufacturing the sheet-type air cell of this aspect preferably includes forming the electrolyte by (i) dissolving the thickening agent that has a functional group in the molecule, the functional group including a carboxyl group or its salt, in the aqueous solution (electrolyte solution) that contains an electrolyte salt and has a pH of 3 or more and less than 12, and (ii) mixing the resultant solution and an aqueous solution in which the gelation accelerator composed of a polyvalent metal salt is dissolved.

A patch of the present invention is wearable and includes the sheet-type air cell of the present invention as a power supply.

Effects of the Invention

The present invention can provide a sheet-type air cell with excellent storage properties, a method for manufacturing the sheet-type air cell, and a patch including the sheet-type air cell.

DESCRIPTION OF THE INVENTION

Figure 1:
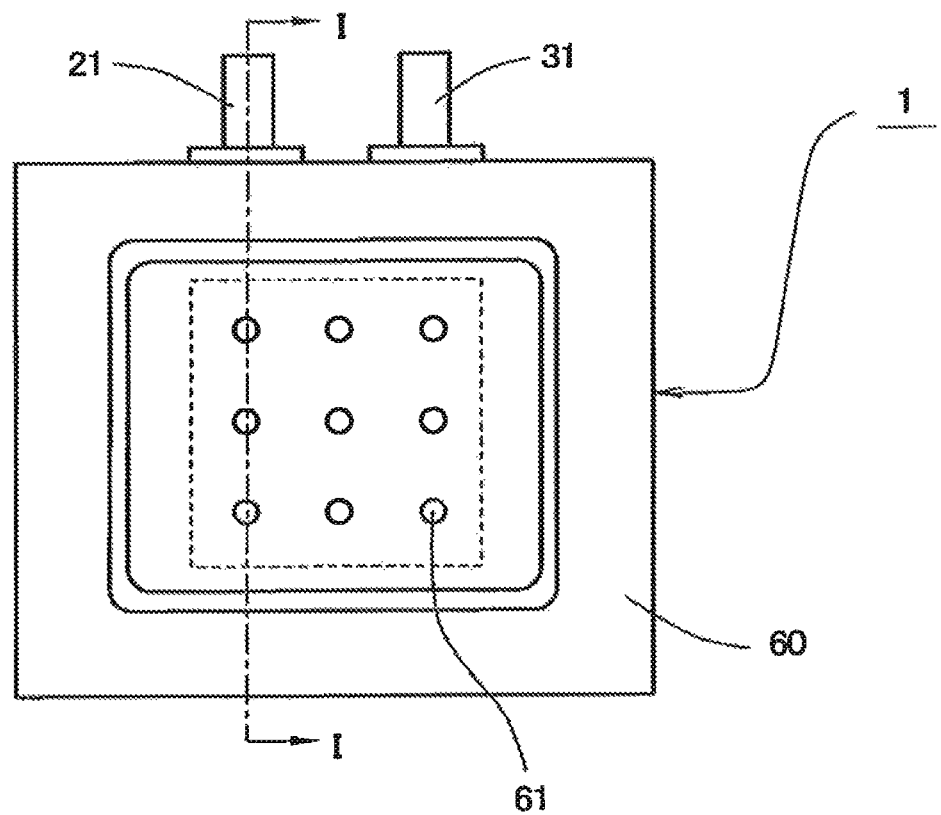
FIG. 1 is a plan view schematically showing an example of a sheet-type air cell of the present invention.

In the first aspect of the sheet-type air cell of the present invention, the electrolyte solution is an aqueous solution having a pH of 3 or more and less than 12 and contains a water-soluble high-boiling solvent with a boiling point of 150° C. or more in an amount of 3 to 30% by mass of the total solvent.

The high-boiling solvent can be regarded as being substantially nonvolatile. Depending on its content, the high-boiling solvent may reduce the vapor pressure of water and suppress the vaporization of water from the electrolyte solution. Thus, in the sheet-type air cell of the first aspect, it is possible to suppress the drying up that can occur, e.g., when water is vaporized from the electrolyte solution and dissipated to the outside of the cell through the air holes of the sheet-type outer case. Therefore, good discharge characteristics can be maintained for a long time. Consequently, the sheet-type air cell of the first aspect has excellent storage properties.

The upper limit of the boiling point of the water-soluble high-boiling solvent is usually 320° C.

It is desirable that the water-soluble high-boiling solvent has a high surface tension and a high relative dielectric constant in order to more favorably maintain the discharge characteristics of the sheet-type air cell. When the sheet-type air cell is discharged, the positive electrode (catalyst layer) needs to be in contact with air. If the surface tension of the water-soluble high-boiling solvent in the electrolyte solution is low, the surface of the catalyst layer of the positive electrode is likely to be wet with the electrolyte solution. This may inhibit the reaction of the catalyst layer and lead to poor discharge characteristics. However, these problems can be avoided by using the water-soluble high-boiling solvent with a high surface tension.

In general, the relative dielectric constant of an organic solvent is lower than that of water. Therefore, the ionic conduction will be more reduced by mixing the organic solvent with water, as compared to using only water, to prepare the electrolyte solution. This may degrade the discharge characteristics of the cell. However, these problems can be avoided by using the water-soluble high-boiling solvent with a high relative dielectric constant.

Specifically, the surface tension of the water-soluble high-boiling solvent is preferably 30 mN/m or more. The upper limit of the surface tension of the water-soluble high-boiling solvent is usually 70 mN/m. In this specification, the surface tension of the water-soluble high-boiling solvent may be measured with a Wilhelmy method using a commercially available device (e.g., "CBVP-Z" manufactured by Kyowa Interface Science Co., Ltd).

The relative dielectric constant of the water-soluble high-boiling solvent is preferably 30 or more. The upper limit of the relative dielectric constant of the water-soluble high-boiling solvent is usually 65. In this specification, the relative dielectric constant of the water-soluble high-boiling solvent may be obtained from the dielectric constant that is measured using, e.g., "Precision LCR Meter HP 4284" manufactured by Hewlett Packard.

Specific examples of the water-soluble high-boiling solvent suitable for the electrolyte solution include the following: polyhydric alcohols such as ethylene glycol (boiling point: 197° C., surface tension: 48 mN/m, relative dielectric constant: 39), propylene glycol (boiling point: 188° C., surface tension: 36 mN/m, relative dielectric constant: 32), and glycerol (boiling point: 290° C., surface tension: 63 mN/m, relative dielectric constant: 43); and polyalkylene glycol (having a molecular weight of preferably 600 or less) such as polyethylene glycol (PEG, e.g., boiling point: 230° C., surface tension: 43 mN/m, relative dielectric constant: 35). The electrolyte solution may contain either only one or two or more of these water-soluble high-boiling solvents, and more preferably may contain glycerol.

To ensure a good effect of the water-soluble high-boiling solvent when it is used, the content of the water-soluble high-boiling solvent in the electrolyte solution is preferably 1% by mass or more, and more preferably 3% by mass or more of the total solvent. However, if the amount of the water-soluble high-boiling solvent in the electrolyte solution is too large, the ionic conduction of the electrolyte solution becomes too small, so that the cell characteristics may be degraded. Thus, the content of the water-soluble high-boiling solvent in the electrolyte solution is preferably 30% by mass or less, and more preferably 20% by mass or less of the total solvent.

In the second aspect of the sheet-type air cell of the present invention, the electrolyte is obtained by blending the thickening agent and the aqueous solution (electrolyte solution) that contains an electrolyte salt and has a pH of 3 or more and less than 12.

The thickening agent blended with the electrolyte solution increases the viscosity of the electrolyte solution to form preferably a gel electrolyte, and also functions as a humectant. Thus, in the sheet-type air cell of the second aspect, it is possible to suppress the drying up that can occur, e.g., when water is vaporized from the electrolyte and dissipated to the outside of the cell through the air holes of the sheet-type outer case. Therefore, good discharge characteristics can be maintained for a long time. Consequently, the sheet-type air cell of the second aspect has excellent storage properties.

The thickening agent used to form the electrolyte may be any of various synthetic polymers or natural polymers. Specific examples of the thickening agent include the following: cellulose derivatives such as carboxymethyl cellulose (CMC) and carboxyethyl cellulose (CEC); polyalkylene glycol (having a molecular weight of preferably 1000 or more, and more preferably 10000 or more) such as polyethylene glycol (PEG); polyvinylpyrrolidone; polyvinyl acetate; starch; guar gum; xanthan gum; sodium alginate; hyaluronic acid; gelatin; and polyacrylic acid. The electrolyte may be formed by using either only one or two or more of the various water-soluble polymers. The molecular weight (average molecular weight) of commercially available polyalkylene glycol such as PEG is generally found on the label. In this specification, the molecular weight of polyalkylene glycol means such a nominal value provided by the manufacturer.

Among the above water-soluble polymers, CMC, polysaccharides such as xanthan gum, and high molecular weight polyalkylene glycol (with a molecular weight of 1000 or more) are more preferred because the effect of thickening the electrolyte solution is high, and the electrolyte with good properties can be more easily prepared.

The CMC is an anionic polymer and is likely to be affected by metal ions or salts when they are present together. Thus, the effect of thickening the electrolyte solution may be reduced. However, the CMC with a high degree of etherification is less affected by metal ions or salts, and therefore can have a better effect of thickening the electrolyte solution. Specifically, the degree of etherification of the CMC is preferably 0.9 or more, and more preferably 1.0 or more. In this specification, the degree of etherification of the CMC is a value that represents the number of carboxymethyl groups that are ether-linked to one anhydroglucose unit. The degree of etherification of the CMC is preferably 1.6 or less.

Moreover, when the thickening agent such as CMC, CEC, xanthan gum, or sodium alginate is used, where the functional group including a carboxyl group or its salt (—COOH, —COONa, etc.) is present in the molecule of the thickening agent, it is preferable that a polyvalent metal salt serving as a gelation accelerator is added to the electrolyte. In this case, the gelation accelerator acts on the thickening agent so that the electrolyte is more suitably gelatinized. This makes it much easier to form a gel electrolyte with good properties.

The polyvalent metal salt that can be used as a gelation accelerator differs according to the type of the thickening agent used. As the polyvalent metal salt, salts of divalent or trivalent metal ions are preferred. Examples of the polyvalent metal salt include the following: alkaline-earth metal salts such as magnesium salts (e.g., magnesium sulfate) and calcium salts (calcium sulfate); aluminum salts such as aluminum nitrate and aluminum sulfate; iron salts such as iron (II) chloride, iron (III) chloride, and iron (III) sulfate; and chromium salts such as chromium nitrate. Among them, aluminum salts and iron salts are more preferred. In the sheet-type air cell of the second aspect, the aqueous solution having a pH of 3 or more and less than 12 is used to form the electrolyte, thereby reducing the environmental impact of the cell (as will be described in detail later). The use of aluminum salts and iron salts as a gelation accelerator can suppress an increase in the environmental impact of the gelation accelerator.

In terms of sufficiently increasing the viscosity of the electrolyte and ensuring good ionic conduction, the content of the thickening agent in the electrolyte is preferably 0.1% by mass or more, and more preferably 0.2% by mass or more. The content of the thickening agent in the electrolyte is also preferably 5% by mass or less, and more preferably 3% by mass or less.

When the polyvalent metal salt (gelation accelerator) is added to the electrolyte, in terms of achieving a better effect of the polyvalent metal salt, the content of the polyvalent metal salt is preferably 1 or more, and more preferably 2 or more with respect to 100 of the thickening agent at a mass ratio. Even if the content of the polyvalent metal salt is increased, its effect becomes saturated. Thus, the content of the polyvalent metal salt in the electrolyte is preferably 30 or less, and more preferably 20 or less with respect to 100 of the thickening agent at a mass ratio.

When the electrolyte salt also serves as a gelation accelerator, the content of the gelation accelerator may be within a suitable concentration range of the electrolyte salt.

The electrolyte solution of the sheet-type air cell of the first aspect is an aqueous solution that contains the electrolyte salt along with the water-soluble high-boiling solvent and has a pH of 3 or more and less than 12. The electrolyte of the sheet-type air cell of the second aspect is formed using an aqueous solution that contains the electrolyte salt and has a pH of 3 or more and less than 12.

Examples of the electrolyte salt dissolved in the aqueous solution include the following: chlorides such as sodium chloride, potassium chloride, magnesium chloride, calcium chloride, ammonium chloride, and zinc chloride; hydroxides of alkali metals or alkaline-earth metals (e.g., sodium hydroxide, potassium hydroxide, and magnesium hydroxide), acetates (e.g., sodium acetate, potassium acetate, and magnesium acetate), nitrates (e.g., sodium nitrate, potassium nitrate, and magnesium nitrate), sulfates (e.g., sodium sulfate, potassium sulfate, and magnesium sulfate), phosphates (e.g., sodium phosphate, potassium phosphate, and magnesium phosphate), borates (e.g., sodium borate, potassium borate, and magnesium borate), citrates (e.g., sodium citrate, potassium citrate, and magnesium citrate), and glutamates (e.g., sodium glutamate, potassium glutamate, and magnesium glutamate); hydrogencarbonates of alkali metals (e.g., sodium hydrogencarbonate and potassium hydrogencarbonate); percarbonates of alkali metals (e.g., sodium percarbonate and potassium percarbonate); compounds containing halogens such as fluorides; and polycarboxylic acids. The aqueous solution may contain either one or two or more of these electrolyte salts.

As the electrolyte salt, salts of strong acids and weak bases are preferably used. The strong acids may be selected from hydrochloric acid, sulfuric acid, and nitric acid. The weak bases may be typified by ammonia and hydroxides of metallic elements such as aluminum hydroxide and magnesium hydroxide. Moreover, ammonium salts or salts of particular metallic elements are also preferred. Specifically, salts of at least one type of ions selected from $Cl^-$, $SO_4^{2-}$, $HSO_4^-$, and $NO_3^-$ and at least one type of ions selected from Al ions, Mg ions, Fe ions, and ammonium ions are more preferred. Examples of the salts include the following: ammonium salts such as ammonium sulfate, ammonium hydrogen sulfate $((NH_4)HSO_4)$, ammonium chloride, and ammonium nitrate; aluminum salts such as aluminum sulfate, aluminum chloride, and aluminum nitrate; magnesium salts such as magnesium sulfate, magnesium chloride, magnesium chloride hydroxide (MgCl(OH)), and magnesium nitrate; and iron salts such as iron (II) sulfate, iron (II) ammonium sulfate $((NH_4)_2Fe(SO_4)_2)$, iron (III) sulfate, iron (II) chloride, and iron (II) nitrate.

Aqueous solutions containing the salts of strong acids and weak bases have a relatively weak corrosive action on metals or alloys that can be a negative electrode active material, as compared to aqueous solutions (electrolyte solutions) containing salts of strong acids and strong bases such as sodium chloride. Moreover, aqueous solutions containing salts of metallic elements selected from Al, Mg, and Fe or ammonium salts have a relatively high conductivity, as compared to, e.g., an aqueous solution of zinc chloride. Thus, the use of aqueous solutions containing the salts of strong acids and weak bases, i.e., the salts of at least one type of ions selected from $Cl^-$, $SO_4^{2-}$, $HSO_4^-$, and $NO_3^-$ and at least one type of ions selected from Al ions, Mg ions, Fe ions, and ammonium ions can further improve the discharge characteristics of the sheet-type air cell.

The salt of $Cl^-$ ions and $Fe^{3+}$ ions (i.e., iron (III) chloride) has a strong corrosive action on a metal material that can be a negative electrode active material, as compared to salts of other combinations of ions. Therefore, salts other than iron (III) chloride are preferably used. Moreover, ammonium salts are more preferred because they are less likely to cause corrosion of the metal material.

Depending on the combination of the electrolyte salt and the thickening agent to form the electrolyte of the sheet-type air cell of the second aspect, the electrolyte salt itself may function as a gelation accelerator, and thus it would be impossible to form a uniform gel electrolyte or a gel electrolyte with sufficient ionic conduction. These problems can be prevented in the following manner. For example, the electrolyte salt may be made of only salts of monovalent metal ions or made of salts of polyvalent metal ions in combination with salts of monovalent metal ions. Alternatively, an aqueous solution containing the electrolyte salt and an aqueous solution containing the thickening agent may be prepared separately and then mixed together to form the electrolyte. Moreover, ammonium salts may be preferably used as the electrolyte salt.

Among the above salts of strong acids and weak bases, perchlorate may create a risk of combustion or explosion when it is heated or subjected to shock. Therefore, from the viewpoint of environmental impact and safety of disposal, perchlorate should not be contained in the aqueous solution. Even if it is contained, the amount of perchloric acid ions is preferably as small as possible (i.e., preferably less than 100 ppm, and more preferably less than 10 ppm).

Among the above salts of strong acids and weak bases, heavy metal salts (other than iron salts) typified by, e.g., zinc chloride and copper sulfate are often harmful. Therefore, from the viewpoint of environmental impact and safety of disposal, heavy metal salts should not be contained in the aqueous solution. Even if they are contained, the amount of heavy metal ions other than iron ions is preferably as small as possible (i.e., preferably less than 100 ppm, and more preferably less than 10 ppm).

The pH of the aqueous solution is 3 or more, and preferably 5 or more. Furthermore, the pH of the aqueous solution is less than 12, preferably 10 or less, and more preferably less than 7. Compared to, e.g., a strong alkaline aqueous solution with a high pH, the aqueous solution having a pH within the above range can improve the safety of disposal of the sheet-type air cell and can also reduce the environmental impact after disposal.

The concentration of the electrolyte salt in the aqueous solution may be determined so that the conductivity of the electrolyte solution can be adjusted, e.g., to about 80 to 700 mS/cm. The concentration of the electrolyte salt is usually 5 to 50% by mass.

It is preferable that an indium compound is dissolved in the aqueous solution. When the indium compound is dissolved in the aqueous solution, the generation of hydrogen gas inside the cell can be favorably suppressed.

Examples of the indium compound dissolved in the aqueous solution include indium hydroxide, indium oxide, indium sulfate, indium sulfide, indium nitrate, indium bromide, and indium chloride.

The concentration of the indium compound in the aqueous solution is preferably 0.005% by mass or more, more preferably 0.01% by mass or more, and particularly preferably 0.05% by mass or more. The concentration of the indium compound in the aqueous solution is also preferably 1% by mass or less, more preferably 0.5% by mass or less, and particularly preferably 0.1% by mass or less.

In addition to the above components, if necessary, the aqueous solution may contain various known additives so as not to impair the effects of the present invention. For example, zinc oxide may be added to the aqueous solution to prevent corrosion (oxidation) of the metal material used for the negative electrode. In this case, zinc oxide also may be added to the negative electrode.

In the sheet-type air cell of the first aspect, the electrolyte solution may be in a liquid state or may be turned into a so-called gel state by using, e.g., a thickening agent. The use of the gel electrolyte solution (gel electrolyte) can further improve the effect of inhibiting corrosion of the negative electrode active material.

For example, metals or alloys that can be a negative electrode active material are formed into foil, which can be directly used for the negative electrode. In this case, if the foil is broken by corrosion due to the electrolyte solution, the conductivity of the negative electrode may be reduced, and thus the capacity of the negative electrode cannot be drawn sufficiently. However, such breakage of the foil of the negative electrode can be suppressed by using the electrolyte solution that contains the electrolyte salt with the concentration as described above. Moreover, the corrosion inhibition effect is further improved with the use of the gel electrolyte, making it possible to more favorably suppress a reduction in the cell capacity.

Examples of the thickening agent that can be used with the electrolyte solution include the following: polyacrylic acids (such as polyacrylic acid, sodium polyacrylate, and ammonium polyacrylate); and celluloses (such as CMC, methylcellulose, hydroxypropyl cellulose, and alkaline salts thereof). As disclosed in JP 2001-307746 A, it is also preferable that water absorbent polymers based on cross-linked polyacrylic acid or its salt (such as sodium polyacrylate and ammonium polyacrylate) are used in combination with the thickening agent other than these polymers. The thickening agent combined with the water absorbent polymers may be, e.g., the above celluloses or cross-linked branched polyacrylic acid or its salt (such as sodium salt and ammonium salt). In addition to the above, the various synthetic polymers or natural polymers, which have been listed as the thickening agent used to form the electrolyte of the sheet-type air cell of the second aspect, may also be used as the thickening agent combined with the water absorbent polymers. These thickening agents may be used alone or in combinations of two or more.

Among the above thickening agents, CMC with a degree of etherification of 0.9 to 1.6 is preferred. This is because such CMC has a significant effect of thickening the electrolyte solution and can make it easier to prepare a gel electrolyte solution (gel electrolyte) with good properties, as previously described regarding the thickening agent used to form the electrolyte of the sheet-type air cell of the second aspect.

In the sheet-type air cell of the second aspect, the electrolyte preferably contains a water-soluble high-boiling solvent with a boiling point of 150° C. or more. With this configuration, it is possible to more favorably suppress degradation of the cell characteristics due to the vaporization (i.e., drying up) of water from the electrolyte, so that the storage properties of the cell can be further improved. The upper limit of the boiling point of the water-soluble high-boiling solvent is usually 320° C.

Moreover, it is desirable that the water-soluble high-boiling solvent used for the sheet-type air cell of the second aspect has a high surface tension and a high relative dielectric constant, for the same reason as the sheet-type air cell of the first aspect. The suitable values of the surface tension and relative dielectric constant of the water-soluble high-boiling solvent in the second aspect are the same as those of the water-soluble high-boiling solvent in the first aspect. The specific examples of the water-soluble high-boiling solvent that can be used for the sheet-type air cell of the second aspect are also the same as those of the water-soluble high-boiling solvent used for the sheet-type air cell of the first aspect.

When the electrolyte of the sheet-type air cell of the second aspect contains the water-soluble high-boiling solvent, the content of the water-soluble high-boiling solvent in the electrolyte is preferably 1% by mass or more, and more preferably 3% by mass or more of the total solvent, for the same reason as the content of the water-soluble high-boiling solvent in the electrolyte solution of the sheet-type air cell of the first aspect. Furthermore, the content of the water-soluble high-boiling solvent in the electrolyte is preferably 30% by mass or less, and more preferably 20% by mass or less of the total solvent, for the same reason as described above.

Hereinafter, the common configuration shared by both sheet-type air cells of the first aspect and the second aspect will be described.

The positive electrode (air electrode) of the sheet-type air cell has a catalyst layer. For example, the positive electrode with a laminated structure of the catalyst layer and a current collector may be used.

The catalyst layer may contain, e.g., a catalyst and a binder.

Examples of the catalyst of the catalyst layer include the following: silver; platinum metals or alloys thereof, transition metals; platinum/metal oxides such as $Pt/IrO_2$; perovskite oxides such as $La_{1-x}Ca_xCoO_3$; carbides such as WC; nitrides such as $Mn_4N$; manganese oxides such as manganese dioxide; and carbon (including, e.g., graphite, carbon black (acetylene black, Ketjenblack, channel black, furnace black, lamp black, thermal black, etc.), charcoal, and activated carbon). These catalysts may be used alone or in combinations of two or more.

The heavy metal content in the catalyst layer, except for the components of the electrolyte solution, is preferably 1% by mass or less. When the positive electrode has the catalyst layer with a low heavy metal content, the environmental impact can be reduced even if the cell is disposed of without any special treatment.

In this specification, the heavy metal content in the catalyst layer can be measured by X-ray fluorescence analysis. For example, the measurement can be performed using "ZSX100e" manufactured by Rigaku Corporation under the following conditions: excitation source, Rh 50 kV and analysis area, $\varphi 10$ mm.

It is recommended that the catalyst of the catalyst layer should contain no heavy metal, but preferably contain the various types of carbon as described above.

In terms of further improving the reactivity of the positive electrode, the specific surface area of the carbon that is used as the catalyst is preferably 200 $m^2/g$ or more, more preferably 300 $m^2/g$ or more, and further preferably 500 $m^2/g$ or more. In this specification, the specific surface area of the carbon is determined by a BET method in accordance with JIS K 6217. For example, the specific surface area of the carbon can be measured with a specific surface area measuring device ("Macsorb HM model-1201" manufactured by Mountech Co., Ltd.) based on a nitrogen adsorption method. The upper limit of the specific surface area of the carbon is usually about 2000 $m^2/g$.

The content of the catalyst in the catalyst layer is preferably 20 to 70% by mass.

Examples of the binder of the catalyst layer include fluorocarbon resin binders such as PVDF, PTFE, copolymers of vinylidene fluoride, and copolymers of tetrafluoroethylene (including, e.g., a vinylidene fluoride-hexafluoropropylene copolymer (PVDF-HFP), a vinylidene fluoride-chlorotrifluoroethylene copolymer (PVDF-CTFE), a vinylidene fluoride-tetrafluoroethylene copolymer (PVDF-TFE), and a vinylidene fluoride-hexafluoropropylene-tetrafluoroethylene copolymer (PVDF-HFP-TFE)). Among them, polymers of tetrafluoroethylene (PTFE) or copolymers of tetrafluoroethylene are preferred, and PTFE is more preferred. The content of the binder in the catalyst layer is preferably 3 to 50% by mass.

The positive electrode can be produced by, e.g., mixing the above catalyst, binder, or the like with water, rolling the mixture between rotating rolls, and bringing the rolled material into close contact with a current collector. There may be another way of producing the positive electrode. First, a composition (slurry, paste, etc.) for forming a catalyst layer is prepared by dispersing the above catalyst and optionally the binder or the like in water or an organic solvent. Then, the composition is applied to the surface of a current collector and dried, which is further subjected to pressing (e.g., calendering) as needed.

The current collector of the positive electrode may be, e.g., a mesh, foil, expanded metal, or punching metal made of metals such as titanium, nickel, stainless steel, and copper, or may be a porous carbon sheet such as carbon mesh, carbon cloth, or carbon paper. The thickness of the current collector of the positive electrode is preferably 10 to 300 μm.

Moreover, when the sheet-type outer case is formed of a resin film or a laminated material of a resin film and a metal film, the resin film or a part of the laminated material may also be used as the current collector of the positive electrode. In such a case, e.g., the current collector can be provided by applying a carbon paste to the surface of the resin film or the laminated material that is to be the inner surface of the sheet-type outer case. Alternatively, the metal layer of the laminated material can also serve as the current collector. Then, a positive electrode mixture layer or the catalyst layer can be formed on the surface of the current collector in the same manner as described above, thus producing the positive electrode. The thickness of the carbon paste layer is preferably 30 to 300 μm.

The negative electrode of the sheet-type air cell may contain a metal material. Examples of the metal material include the following: a zinc-based material (which collectively refers to both a zinc material and a zinc alloy material); a magnesium-based material (which collectively refers to both a magnesium material and a magnesium alloy material); and an aluminum-based material (which collectively refers to both an aluminum material and an aluminum alloy material). In this negative electrode, metals such as zinc, magnesium, and aluminum act as an active material.

Specifically, the negative electrode containing the metal material may be a negative electrode that contains, e.g., zinc-based particles (which collectively refer to both zinc particles and zinc alloy particles), magnesium-based particles (which collectively refer to both magnesium particles and magnesium alloy particles), or aluminum-based particles (which collectively refer to both aluminum particles and aluminum alloy particles).

The alloy constituents of the zinc alloy particles may be, e.g., indium (the content is, e.g., 0.005 to 0.05% by mass), bismuth (the content is, e.g., 0.005 to 0.05% by mass), and aluminum (the content is, e.g., 0.001 to 0.15% by mass).

The alloy constituents of the magnesium alloy particles may be, e.g., calcium (the content is, e.g. 1 to 3% by mass), manganese (the content is, e.g., 0.1 to 0.5% by mass), zinc (the content is, e.g., 0.4 to 1% by mass), and aluminum (the content is, e.g., 8 to 10% by mass).

The alloy constituents of the aluminum alloy particles may be, e.g., zinc (the content is, e.g., 0.5 to 10% by mass), tin (the content is, e.g., 0.04 to 1.0% by mass), gallium (the content is, e.g., 0.003 to 1.0% by mass), silicon (the content is, e.g., 0.05% by mass or less), iron (the content is, e.g., 0.1% by mass or less), magnesium (the content is, e.g., 0.1 to 2.0% by mass), and manganese (the content is, e.g., 0.01 to 0.5% by mass).

The negative electrode may contain only one type of metal particles or two or more types of metal particles.

In view of the environmental impact of the cell for disposal, it is preferable that the metal material used for the negative electrode contains the smallest possible amount of mercury, cadmium, lead, and chromium. Specifically, it is more preferable that the mercury content is 0.1% by mass or less, the cadmium content is 0.01% by mass or less, the lead content is 0.1% by mass or less, and the chromium content is 0.1% by mass or less.

The particle size of the zinc-based particles may be defined as follows. For example, the proportion of the particles with a particle diameter of 75 µm or less is preferably 50% by mass or less, and more preferably 30% by mass or less of all particles. Moreover, the proportion of the particles with a particle diameter of 100 to 200 µm is 50% by mass or more, and more preferably 90% by mass or more of all particles.

The particle size of the magnesium-based particles and the aluminum-based particles may be defined as follows. For example, the proportion of the particles with a particle diameter of 30 µm or less is preferably 50% by mass or less, and more preferably 30% by mass or less of all particles. Moreover, the proportion of the particles with a particle diameter of 50 to 200 µm is 50% by mass or more, and more preferably 90% by mass or more of all particles.

In this specification, the particle size of the metal particles means a particle diameter ($D_{50}$) at a cumulative frequency of 50% in the volume-based distribution, which is measured with a laser scattering particle size distribution analyzer (e.g., "LA-920" manufactured by HORIBA, Ltd.) by dispersing the particles in a medium that does not dissolve those particles.

When the negative electrode contains the metal particles, e.g., a thickening agent (such as sodium polyacrylate or CMC (particularly having the above degree of etherification suitable for the thickening agent for the electrolyte solution)) and a binder may be added to the negative electrode as needed. This may be mixed with an electrolyte solution to form a negative electrode agent (such as a gel-like negative electrode). The amount of the thickening agent in the negative electrode is preferably, e.g., 0.5 to 1.5% by mass. The amount of the binder in the negative electrode is preferably 0.5 to 3% by mass.

The electrolyte solution used for the negative electrode containing the metal particles may be the same as either the aqueous solution that is injected into the sheet-type air cell of the first aspect or the aqueous solution that is used to form the electrolyte of the sheet-type air cell of the second aspect.

The content of the metal particles in the negative electrode is preferably, e.g., 60% by mass or more, and more preferably 65% by mass or more. The content of the metal particles in the negative electrode is also preferably 95% by mass or less, and more preferably 90% by mass or less.

The negative electrode containing the metal particles preferably contains an indium compound. The indium compound contained in the negative electrode can more effectively prevent the generation of hydrogen gas due to a corrosion reaction between the metal particles and the electrolyte solution (i.e., the electrolyte).

Examples of the indium compound include indium oxide and indium hydroxide.

The amount of the indium compound in the negative electrode is preferably 0.003 to 1 with respect to 100 of the metal particles at a mass ratio.

The negative electrode may also be formed of a metal sheet. The metal sheet may be, e.g., a zinc-based sheet (zinc foil, zinc alloy foil, etc.) having the same composition as the zinc-based particles or a magnesium-based sheet (magnesium foil, magnesium alloy foil, etc.) having the same composition as the magnesium-based particles. Such a negative electrode preferably has a thickness of 10 to 500 µm.

The negative electrode containing the metal material may include a current collector as needed. The current collector of the negative electrode may be, e.g., a mesh, foil, expanded metal, or punching metal made of metals such as nickel, copper, and stainless steel, or may be a carbon sheet or carbon mesh. The thickness of the current collector of the negative electrode is preferably 10 to 300 µm.

Like the positive electrode, the current collector of the negative electrode can be provided by applying a carbon paste to the surface that is to be the inner surface of the sheet-type outer case. Alternatively, the metal layer of the sheet-type outer case can also serve as the current collector. The thickness of the carbon paste layer is preferably 50 to 200 µm.

The separator of the sheet-type air cell may be any separator that is generally used in various cells. Examples of the separator include a porous resin film (such as a microporous film or nonwoven fabric) and a semipermeable membrane typified by a cellophane film. In terms of preventing a short circuit of the sheet-type air cell and improving the load characteristics, the separator is preferably made of a semipermeable membrane.

When the separator is made of a resin porous film, polyolefins such as polyethylene (PE), polypropylene (PP), and an ethylene-propylene copolymer may be used.

The resin separator preferably has a porosity of 30 to 80% and a thickness of 10 to 100 µm.

When the separator is made of a semipermeable membrane such as a cellophane film, it may consist only of the semipermeable membrane. However, the semipermeable membrane can be easily damaged during cell assembly because of its low strength. Therefore, it is also recommended that the separator should be made of a laminated material of the semipermeable membrane and a grafted film of a particular polymer.

The graft polymer constituting the grafted film is composed of, e.g., (meth)acrylic acid or its derivative that is graft-polymerized onto polyolefin (polyethylene, polypropylene, etc.), which is a backbone polymer. However, any graft polymer in this form can be used and is not limited to the method of graft polymerization of (meth)acrylic acid or its derivative onto polyolefin.

The (meth)acrylic acid or its derivative of the graft polymer is expressed by the following general formula (1). In the general formula (1), $R^1$ represents H or $CH_3$ and $R^2$ represents H or a hydrophilic substituent such as $NH_4$, Na, K, Rb, or Cs.

[Chemical Formula 1]

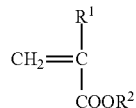

(1)

In the grafted film and the cellophane film, their polymers have the ability to absorb the electrolyte solution (i.e., the electrolyte) and allow ions to pass through them.

The graft polymer constituting the grafted film preferably has a graft ratio of 160% or more. The graft ratio is defined by the following formula (2). There is a correlation between the graft ratio of the graft polymer and the electrical resistance of the grafted film. Therefore, when the graft polymer with the above graft ratio is used, the electrical resistance of the grafted film can be controlled in the range of 20 to 120 $m\Omega \cdot in^2$, which are suitable values. The electrical resistance of the grafted film may be determined by an AC voltage drop method (1 kHz). In this method, the film is immersed in a 40% KOH (specific gravity: 1.400±0.005) aqueous solution at 25±1° C. while the ambient temperature is set to 20 to 25° C. Then, the film is taken out after 5 to 15 hours, and the electrical resistance can be measured.

$$\text{Graft ratio (\%)} = 100 \times (A-B)/B \qquad (2)$$

In the formula (2), A represents the mass (g) of the graft polymer and B represents the mass (g) of the backbone polymer in the graft polymer. For example, when the graft polymer is formed by graft polymerization of (meth)acrylic acid or its derivative onto polyolefin (backbone polymer), the value "B (the mass of the backbone polymer in the graft polymer)" in the formula (2) can be obtained by previously measuring the mass of the backbone polymer used for this graft polymerization. The graft ratio of the graft polymer may be more than 100% because, in some cases, the monomers (i.e., the (meth)acrylic acid or its derivative) are polymerized with each other, rather than graft-polymerized, so that the graft molecules can have a long chain. The upper limit of the graft ratio of the graft polymer as defined by the formula (2) is preferably 400%. The term "(meth)acrylic acid" collectively refers to both acrylic acid and methacrylic acid.

When the separator consists only of a cellophane film, the thickness of the separator is preferably, e.g., 15 μm or more. The thickness of the separator is also preferably 40 μm or less, and more preferably 30 μm or less.

When the separator is made of a laminated material of a grafted film and a cellophane film, the thickness of the separator, i.e., the total thickness of the grafted film and the cellophane film is preferably, e.g., 30 μm or more, and more preferably 40 μm or more. The thickness of the separator is also preferably 70 μm or less, and more preferably 60 μm or less.

Moreover, when the separator is made of a laminated material of a grafted film and a cellophane film, the thickness of the grafted film is preferably, e.g., 15 μm or more, and more preferably 25 μm or more. The thickness of the grafted film is also preferably 30 μm or less.

The laminated material of the grafted film and the cellophane film used for the separator is commercially available, e.g., from Yuasa Membrane Systems Co., Ltd. under the name of "YG9132", "YG9122", or "YG2152".

The separator may be formed by combining, e.g., the cellophane film or both the cellophane film and the grafted film with a liquid-absorbing layer (i.e., an electrolyte solution (electrolyte) holding layer) such as vinylon-rayon mixed paper. In this case, the thickness of the liquid-absorbing layer is preferably 20 to 500 μm.

The sheet-type air cell of the present invention has the sheet-type outer case. Therefore, the sheet-type air cell can find application where the cell having an outer can is not likely to be used. Moreover, the sheet-type air cell is more easily disposed of than the cell having an outer can, and thus can be expected to make good use of the advantage of smaller environmental impact.

Figure 2:
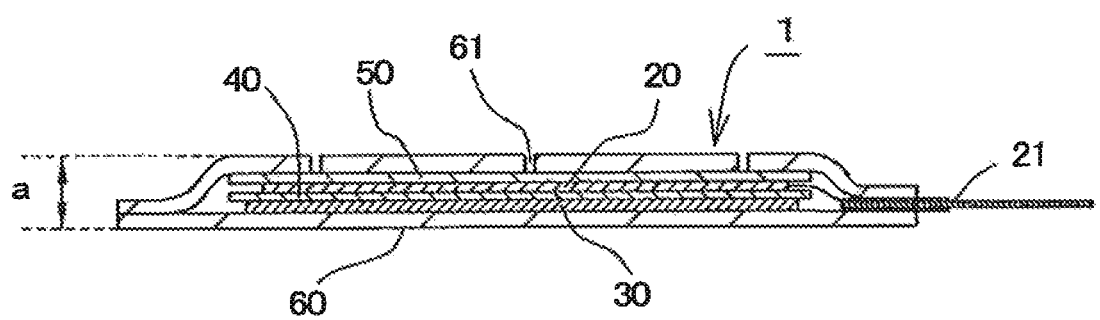
FIG. 2 is a cross-sectional view taken along the line I-I of FIG. 1.

FIGS. 1 and 2 schematically show an example of a sheet-type air cell of the present invention. FIG. 1 is a plan view of the sheet-type air cell and FIG. 2 is a cross-sectional view taken along the line I-I in FIG. 1.

As shown in FIG. 2, a sheet-type air cell 1 includes a positive electrode 20, a separator 40, a negative electrode 30, and an electrolyte solution or an electrolyte (not shown) that are contained in a sheet-type outer case 60. The positive electrode 20 is connected to a positive electrode external terminal 21 via a lead in the cell 1. Although not shown in FIG. 2, the negative electrode 30 is also connected to a negative electrode external terminal 31 via a lead in the cell 1. In FIG. 1, the dotted line indicates the size of a catalyst layer of the positive electrode 20 contained in the sheet-type outer case 60.

The sheet-type outer case 60 has a plurality of air holes 61 at one side, where the positive electrode 20 is provided, to take air into the positive electrode. Moreover, a water repellent membrane 50 for preventing leakage of the electrolyte solution (i.e., the electrolyte) through the air holes 61 is provided on the surface of the positive electrode 20 that faces the sheet-type outer case 60.

The positive electrode 20 has a catalyst layer and may have, e.g., a laminated structure of the catalyst layer and a current collector, as described above. For the purpose of brevity, the individual layers of the positive electrode 20 are not distinguished from each other in FIG. 2.

The sheet-type outer case may be formed of, e.g., a resin film. Examples of the resin film include a nylon film (such as a nylon 66 film) and a polyester film (such as a polyethylene terephthalate (PET) film). The thickness of the resin film is preferably 20 to 100 μm.

The sheet-type outer case is generally sealed by heat-sealing the edges of the upper resin film and the lower resin film of the sheet-type outer case. To further facilitate the heat seal, the resin film and a heat-sealing resin layer may be laminated and used as the sheet-type outer case. The heat-sealing resin of the heat-sealing resin layer may be, e.g., a modified polyolefin film (such as a modified polyolefin ionomer film) or polypropylene and its copolymer. The thickness of the heat-sealing resin layer is preferably 20 to 100 μm.

Moreover, a metal layer may be laminated on the resin film. The metal layer may be, e.g., an aluminum film (including aluminum foil and aluminum alloy foil) or a stainless steel film (such as stainless steel foil). The thickness of the metal layer is preferably 10 to 150 μm.

The resin film of the sheet-type outer case may be, e.g., a laminated film of the heat-sealing resin layer and the metal layer.

The shape of the sheet-type outer case may be, e.g., a polygon (such as triangle, quadrangle, pentagon, hexagon, heptagon, or octagon), a circle, or an ellipse in a plan view. When the sheet-type outer case has a polygonal shape in a plan view, the positive electrode external terminal and the negative electrode external terminal may be drawn from the same side or different sides of the sheet-type outer case to the outside.

In the sheet-type air cell, the water repellent membrane is generally placed between the positive electrode and the outer case, as shown in FIG. 2. The water repellent membrane has not only water repellency, but also air permeability. Specifically, such a water repellent membrane may be composed of, e.g., fluororesin such as PTFE or resin such as polyolefin (polypropylene, polyethylene, etc.). The thickness of the water repellent membrane is preferably 50 to 250 μm.

An air diffusion membrane may be provided between the outer case and the water repellent membrane. The air diffusion membrane supplies air that has been introduced into the outer case to the positive electrode. The air diffusion membrane may be, e.g., a nonwoven fabric made of resin such as cellulose, polyvinyl alcohol, polypropylene, or nylon. The thickness of the air diffusion membrane is preferably 100 to 250 μm.

The thickness (the length indicated by a in FIG. 2) of the sheet-type air cell is not particularly limited and can be appropriately changed in accordance with the use of the sheet-type air cell. One of the advantages of the sheet-type air cell is that the thickness can be reduced. In view of this, the thickness of the sheet-type air cell is preferably, e.g., 1 mm or less.

The lower limit of the thickness of the sheet-type air cell is also not particularly limited. In general, the lower limit of the thickness is preferably 0.2 mm or more to ensure predetermined capacity.

The sheet-type air cell of the present invention has excellent storage properties. Moreover, as described above, since the environmental impact of the cell is small, even if the electrolyte solution (i.e., the electrolyte) leaks due to breakage or the like and adheres to the body, there is less likely to be a problem compared to, e.g., a strong alkaline electrolyte solution with a high pH. Thus, the sheet-type air cell of the present invention is suitable as a power supply for devices used for medical and healthcare purposes, including, e.g., a wearable patch, particularly a patch that can be attached on the surface of the skin to monitor the body conditions such as body temperature, pulse, and perspiration. The sheet-type air cell of the present invention can also be used for the same application as the conventionally known air cells.

EXAMPLES

Hereinafter, the present invention will be described in detail by way of examples. However, the present invention is not limited to the following examples.

Example 1

<Positive Electrode>

A composition for forming a catalyst layer was prepared by mixing 30 parts by mass of carbon (Ketjenblack EC600JD) manufactured by Lion Specialty Chemicals Co., Ltd.) with a DBP oil absorption of 495 $cm^3/100$ g and a specific surface area of 1270 $m^2/g$, 15 parts by mass of an acrylic dispersing agent, 60 parts by mass of SBR, and 500 parts by mass of water.

Using porous carbon paper (thickness: 0.25 mm, porosity: 75%, air permeability (Gurley): 70 sec/100 ml) to form a current collector, the composition for forming a catalyst layer was applied to the surface of the substrate by stripe coating so that the coating amount after drying was 10 $mg/cm^2$. Then, the composition was dried, resulting in a current collector that had a portion in which the catalyst layer was formed and a portion in which no catalyst layer was formed. This current collector was punched into a shape including the portion with the catalyst layer that was 30 mm×30 mm in size, and the portion without the catalyst layer that was 5 mm×15 mm in size, was located at one end of the 30 mm×30 mm portion, and was to be a lead portion. Thus, a positive electrode (air electrode) with a total thickness of 0.27 mm was produced.

<Negative Electrode>

Zinc alloy foil (thickness: 0.05 mm) containing additional elements of In: 0.05%, Bi: 0.04%, and Al: 0.001% was prepared. Then, the zinc alloy foil was punched into a shape including a portion that was 30 mm×30 mm in size and served as an active material, and a portion that was 5 mm×15 mm in size, was located at one end of the 30 mm×30 mm portion, and was to be a lead portion. Thus, a negative electrode was produced.

<Electrolyte Solution>

Glycerol was added to 20% by mass of ammonium sulfate aqueous solution in an amount corresponding to 10% by mass of the total amount of glycerol and water to prepare an electrolyte solution. (The pH of the electrolyte solution was 5.3, which was measured in an environment of 25° C. with a "LAQUA twin compact pH meter" manufactured by HORIBA, Ltd. The electrolyte solutions of the sheet-type air cells in all the following examples and comparative examples had the same pH value measured in the same manner.) The concentration of perchloric acid ions and the concentration of heavy metal ions other than iron ions in the electrolyte solution were less than 100 ppm, respectively. The same is true for the electrolyte solutions of the sheet-type air cells in Examples 2 to 5 and Comparative Examples 1 and 2, as will be described later.

<Separator>

A separator was produced by forming two graft films (each having a thickness of 15 μm) on both sides of a cellophane film (having a thickness of 20 μm). The graft films were composed of a graft copolymer obtained by graft copolymerization of acrylic acid with a polyethylene main chain. The total thickness of the separator was 50 μm.

<Water Repellent Membrane>

A water repellent membrane was a PTFE sheet with a thickness of 200 μm.

<Cell Assembly>

Two 5 cm×5 cm aluminum laminated films (thickness: 65 μm) were used as outer cases. Each of the aluminum laminated films had a structure in which a PET film was provided on the outer surface of aluminum foil, and a polypropylene film (heat-sealing resin layer) was provided on the inner surface of the aluminum foil.

In one of the outer cases that was to be located on the positive electrode side, nine air holes, each of which had a diameter of 1 mm, were formed and spaced at regular intervals of 9 mm (length)×9 mm (width) (i.e., the center-to-center distance of adjacent air holes: 10 mm). Then, the water repellent membrane was thermally welded to the inner surface of this outer case with a hot-melt adhesive. In the other outer case that was to be located on the negative electrode side, in order to improve the sealing properties of the thermally welded portion between the leads and the outer case, a modified polyolefin ionomer film was attached in parallel with the side of the outer case to a portion of the outer case where the leads of the positive electrode and the negative electrode were to be arranged.

The sheet-type outer case having the water repellent membrane was put down, and then the positive electrode, the separator, and the negative electrode were formed in this order on the water repellent membrane. Moreover, the other outer case was placed on top of them so that the modified polyolefin ionomer film was positioned on the leads of the positive electrode and the negative electrode. Next, three sides of the two outer cases were thermally welded to each other, thus providing a bag-like outer case. After the electrolyte solution was injected through the opening of the bag-like outer case, the opening was sealed by thermal welding, and consequently a sheet-type air cell was obtained.

Example 2

An electrolyte solution was prepared in the same manner as Example 1 except that propylene glycol was used instead of glycerol. Then, a sheet-type air cell was produced in the same manner as Example 1 except that this electrolyte solution was used.

Example 3

An electrolyte solution was prepared in the same manner as Example 1 except that ethylene glycol was used instead of glycerol. Then, a sheet-type air cell was produced in the same manner as Example 1 except that this electrolyte solution was used.

Example 4

An electrolyte solution was prepared in the same manner as Example 1 except that the amount of glycerol added was changed to 5% by mass of the total amount of glycerol and water. Then, a sheet-type air cell was produced in the same manner as Example 1 except that this electrolyte solution was used.

Example 5

An electrolyte solution was prepared in the same manner as Example 1 except that the amount of glycerol added was changed to 20% by mass of the total amount of glycerol and water. Then, a sheet-type air cell was produced in the same manner as Example 1 except that this electrolyte solution was used.

Comparative Example 1

A sheet-type air cell was produced in the same manner as Example 1 except that 20% by mass of ammonium sulfate aqueous solution was used as an electrolyte solution without the addition of glycerol.

Comparative Example 2

An electrolyte solution was prepared in the same manner as Example 1 except that the amount of glycerol added was changed to 50% by mass of the total amount of glycerol and water. Then, a sheet-type air cell was produced in the same manner as Example 1 except that this electrolyte solution was used.

The following evaluations were performed on the sheet-type air cells of Examples 1 to 5 and Comparative Examples 1 and 2.

[Evaluation of Discharge Characteristics]

After assembly of the sheet-type air cells, each cell was allowed to stand in the atmosphere for 10 minutes, and then discharged to 0.5 V at a current corresponding to the 100 hour rate with respect to the design capacity of the cell. At this time, the discharge capacity (i.e., the discharge capacity before storage) of the cell was measured. The measured values of the cells were compared relative to the discharge capacity of the cell in Comparative Example 1, which was set to 100.

[Evaluation of Discharge Characteristic Retention Rate after Storage Test]

After assembly of the sheet-type air cells, each cell was stored in the atmosphere at 40° C. for 10 days, and then discharged to 0.5 V at a current corresponding to the 100 hour rate with respect to the design capacity of the cell. At this time, the discharge capacity (i.e., the discharge capacity after storage) of the cell was measured.

The ratio of the discharge capacity after storage to the discharge capacity before storage was determined as a capacity retention rate and the storage properties were evaluated.

Table 1 shows the results of the above evaluations and the configuration of the electrolyte solution of each of the sheet-type air cells in Examples 1 to 5 and Comparative Examples 1 and 2. In Table 1, the content of the water-soluble high-boiling solvent indicates the value with respect to the total solvent in the electrolyte solution.

TABLE 1

| | Water-soluble organic solvent of electrolyte solution | | Cell characteristics | |
|---|---|---|---|---|
| | Type | Content (% by mass) | Discharge capacity | Capacity retention rate (%) |
| Example 1 | Glycerol | 10 | 130 | 85 |
| Example 2 | propylene glycol | 10 | 110 | 77 |
| Example 3 | ethylene glycol | 10 | 120 | 80 |
| Example 4 | glycerol | 5 | 110 | 78 |
| Example 5 | glycerol | 20 | 105 | 88 |
| Comparative Example 1 | — | — | 100 | 65 |
| Comparative Example 2 | glycerol | 50 | 40 | 90 |

As shown in Table 1, the sheet-type air cells in Examples 1 to 5 used the electrolyte solution containing an appropriate amount of the water-soluble high-boiling solvent. Therefore, the cells in Examples 1 to 5 had good discharge capacity, suppressed a reduction in capacity before and after storage, and also had excellent storage properties, as compared to the cell in Comparative Example 1 that used the electrolyte solution containing no water-soluble high-boiling solvent. On the other hand, the discharge capacity of the cell in Comparative Example 2 was smaller than that of the cells in Examples and Comparative Example 1, since the cell in Comparative Example 2 used the electrolyte solution containing an excessively large amount of the water-soluble high-boiling solvent.

Example 6

An ammonium sulfate aqueous solution with a concentration of 20% by mass was prepared. (The pH of the aqueous solution was 5.3, which was measured in an environment of 25° C. with a "LAQUA twin compact pH meter" manufactured by HORIBA, Ltd. The following pH values were measured in the same manner.) Then, CMC (degree of etherification: 1.4) was added to and dissolved in the aqueous solution in an amount of 1.0% by mass to form a high-viscosity electrolyte. The concentration of perchloric acid ions and the concentration of heavy metal ions other than iron ions in the aqueous solution were less than 100 ppm, respectively. The same is true for the aqueous solutions used to form the electrolytes of the sheet-type air cells in Examples 7 to 11, as will be described later.

A sheet-type air cell was produced in the same manner as Example 1 except that the electrolyte thus obtained was used instead of the electrolyte solution prepared in Example 1.

Example 7

An electrolyte was formed in the same manner as Example 6 except that xanthan gum was used instead of CMC. Then, a sheet-type air cell was produced in the same manner as Example 1 except that this electrolyte was used.

Example 8

An electrolyte was formed in the same manner as Example 6 except that PEG (molecular weight: 2000000) was used instead of CMC. Then, a sheet-type air cell was produced in the same manner as Example 1 except that this electrolyte was used.

Example 9

A solution (A) was prepared by dissolving CMC (degree of etherification: 1.4) in an ammonium sulfate aqueous solution (pH=5.3). Moreover, an aluminum sulfate aqueous solution (B) serving as a gelation accelerator was separately prepared. The amounts of ammonium sulfate, CMC, and aluminum sulfate were 20% by mass, 1.0% by mass, and 0.05% by mass with respect to the total amount of the solution (A) and the aqueous solution (B), respectively.

A sheet-type air cell was produced in the same manner as Example 6 except that the solution (A) and the aqueous solution (B) were placed in the bag-like outer case instead of the electrolyte prepared in Example 6. The solution (A) and the aqueous solution (B) were mixed and gelatinized in the outer case after the opening was sealed by thermal welding.

Example 10

A sheet-type air cell was produced in the same manner as Example 9 except that the aqueous solution (B) was replaced by an aqueous solution of iron (III) sulfate.

Example 11

A solution (A) (pH=5.3) was prepared in the same manner as Example 9 except that the solvent was changed to a mixed solvent of water and glycerol. Then, a sheet-type air cell was produced in the same manner as Example 9 except that this solution (A) was used. The amount of glycerol was set to 5.0% by mass of the total amount of glycerol and water that was used in the solution (A) and the aqueous solution (B) in total.

The discharge characteristics and the storage properties (the discharge characteristic retention rate after the storage test) of the sheet-type air cells in Examples 6 to 11 were evaluated in the same manner as, e.g., the cell in Example 1.

Table 2 shows the configuration of each of the sheet-type air cells in Examples 6 to 11. Table 3 shows the results of the above evaluations. Tables 2 and 3 also show the configuration and evaluation results of the cell in Comparative Example 1. In Table 2, the content of the thickening agent and the content of the gelation accelerator indicate the values with respect to the total electrolyte, respectively. The content of the water-soluble high-boiling solvent indicates the value with respect to the total solvent in the electrolyte.

TABLE 2

| | Electrolyte | | | | | |
|---|---|---|---|---|---|---|
| | Thickening agent | | Gelation accelerator | | Water-soluble high-boiling solvent | |
| | Type | Content (% by mass) | Type | Content (% by mass) | Type | Content (% by mass) |
| Example 6 | CMC | 1.0 | — | — | — | — |
| Example 7 | xanthan gum | 1.0 | — | — | — | — |
| Example 8 | PEG | 1.0 | — | — | — | — |
| Example 9 | CMC | 1.0 | aluminum sulfate | 0.05 | — | — |
| Example 10 | CMC | 1.0 | iron (III) sulfate | 0.05 | — | — |
| Example 11 | CMC | 1.0 | aluminum sulfate | 0.05 | glycerol | 5.0 |
| Comparative Example 1 | — | — | — | — | — | — |

TABLE 3

| | Sheet-type air cell | |
|---|---|---|
| | Discharge capacity | Capacity retention rate (%) |
| Example 6 | 120 | 80 |
| Example 7 | 115 | 84 |
| Example 8 | 110 | 75 |
| Example 9 | 125 | 85 |
| Example 10 | 125 | 84 |
| Example 11 | 130 | 90 |
| Comparative Example 1 | 100 | 65 |

As shown in Tables 2 and 3, the sheet-type air cells in Examples 6 to 11 used the electrolyte prepared by blending the thickening agent and the aqueous solution that contained an electrolyte salt and had a pH of 3 or more and less than 12. Therefore, the cells in Examples 6 to 11 had large discharge capacity as well as good discharge characteristics, suppressed a reduction in capacity before and after storage, and also had excellent storage properties, as compared to the cell in Comparative Example 1 that used the electrolyte solution containing no thickening agent.

DESCRIPTION OF REFERENCE NUMERALS

1 Sheet-type air cell
20 Positive electrode (air electrode)
21 Positive electrode external terminal
30 Negative electrode
31 Negative electrode external terminal
40 Separator
50 Water repellent membrane
60 Sheet-type outer case
61 Air hole

The invention claimed is:
1. A sheet-type air cell comprising: a positive electrode having a catalyst layer, a negative electrode, a separator, and an electrolyte that are contained in a sheet-type outer case, wherein an active material of the negative electrode is composed of a metal sheet, the metal sheet is zinc foil or zinc alloy foil having a portion serving as an active material and a lead portion, the electrolyte contains an electrolyte solution and a thickening agent, the electrolyte solution is an aqueous solution that contains an electrolyte salt and has a pH of 3 or more and less than 12 and wherein the electrolyte further contains a water-soluble high-boiling solvent that has a boiling point of 150° C. or more.

2. The sheet-type air cell according to claim 1, wherein the thickening agent has a functional group in a molecule, the functional group including a carboxyl group or its salt.

3. The sheet-type air cell according to claim 1, wherein the thickening agent is polysaccharide or polyalkylene glycol having a molecular weight of 1000 or more.

4. The sheet-type air cell according to claim 3, wherein the thickening agent is a cellulose derivative.

5. The sheet-type air cell according to claim 1, having a thickness of 1 mm or less.

6. The sheet-type air cell according to claim 1, wherein the metal sheet has a thickness of 10 to 500 μm.

7. The sheet-type air cell according to claim 6, wherein the metal sheet is zinc alloy foil containing bismuth.

8. The sheet-type air cell according to claim 1, wherein a concentration of the electrolyte salt in the electrolyte solution is 5 to 50% by mass.

9. The sheet-type air cell according to claim 1, wherein the electrolyte solution contains a salt of a strong acid and a weak base as the electrolyte salt.

10. The sheet-type air cell according to claim 1, wherein the electrolyte solution contains an ammonium salt as the electrolyte salt.

11. The sheet-type air cell according to claim 1, wherein the electrolyte contains polyhydric alcohol or polyalkylene glycol having a molecular weight of 600 or less as the water-soluble high-boiling solvent.

12. The sheet-type air cell according to claim 1, wherein the water-soluble high-boiling solvent has a surface tension of 30 mN/m or more and a relative dielectric constant of 30 or more.

13. The sheet-type air cell according to claim 1, wherein the aqueous solution has a pH of less than 7.

14. The sheet-type air cell according to claim 1, wherein the aqueous solution has a pH of 5 or more.

15. The sheet-type air cell according to claim 1, wherein the positive electrode has a current collector made of a porous carbon sheet.

16. A patch being wearable and comprising a sheet-type air cell as a power supply, the sheet-type air cell comprising a positive electrode having a catalyst layer, a negative electrode, a separator, and an electrolyte that are contained in a sheet-type outer case, wherein an active material of the negative electrode is composed of a metal sheet, the metal sheet is zinc foil or zinc alloy foil having a portion serving as an active material and a lead portion, the electrolyte contains an electrolyte solution and a thickening agent, the electrolyte solution is an aqueous solution that contains an electrolyte salt and has a pH of 3 or more and less than 12 and wherein the electrolyte further contains a water-soluble high-boiling solvent that has a boiling point of 150° C. or more.

* * * * *